United States Patent
Armstrong

(12) 
(10) Patent No.: US 6,811,010 B1
(45) Date of Patent: Nov. 2, 2004

(54) MULTIPLE CONNECTION SYNCHRONIZER

(75) Inventor: Douglas C. Armstrong, Novi, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/717,320

(22) Filed: Nov. 19, 2003

(51) Int. Cl.⁷ ............................................. F16D 21/02
(52) U.S. Cl. ........................ 192/48.91; 192/53.34; 74/339
(58) Field of Search ........................ 74/339; 192/48.9, 192/48.91, 53, 34

(56) References Cited

U.S. PATENT DOCUMENTS

| | | | | |
|---|---|---|---|---|
| 2,560,886 A | * | 7/1951 | Palmer .................... | 475/296 |
| 2,658,413 A | * | 11/1953 | Palmer et al. ............ | 477/60 |
| 6,663,529 B1 | * | 12/2003 | Haka ....................... | 475/303 |

* cited by examiner

*Primary Examiner*—Charles A. Marmor
*Assistant Examiner*—David D. Le
(74) *Attorney, Agent, or Firm*—Leslie C. Hodges

(57) ABSTRACT

A synchronizer clutch assembly includes an input driver member having a shift collar disposed thereon. A plurality of driven members are included in the synchronizer assembly and are operatively connected by the shift collar to provide at least three drive paths from the input driver member to one or more of the output driven members.

4 Claims, 4 Drawing Sheets

MULTIPLE CONNECTION SYNCHRONIZER

TECHNICAL FIELD

This invention relates to mechanical clutch mechanisms and, more particularly, to synchronizer type mechanical clutch mechanisms.

BACKGROUND OF THE INVENTION

Synchronizer clutch mechanisms are employed in countershaft manually shifted transmissions. The purpose of the synchronizer is to permit a ratio change within the transmission from one gear ratio to another. During the ratio change, the synchronizer clutch functions to synchronize the speed of a gear member with a shaft member and then provide a positive drive connection therebetween.

The synchronizer clutch generally includes a shift collar, a pair of synchronizer or blocker rings, and two output drive mechanisms. The shift collar is connected with an input drive mechanism. Each of the drive mechanisms is connected with either a shaft or a gear member. Generally, the input drive member is connected with a shaft and the output driven members are connected with gear members that are rotatably mounted on the shaft. The drive connection between the shaft and the gear member is completed by the synchronizer.

During a ratio change or shift operation, it is necessary to accelerate the gear member to a speed equal to the shaft with which it is to be connected. The synchronizer accomplishes this feat. The synchronizer, including the blocker rings and a cone clutch, establishes speed synchronization between the shift collar and therefore the input, and the output member, which is a gear. The conventional synchronizer is capable of interacting with one shaft and two gear members.

SUMMARY OF THE INVENTION

It is an object of the present invention to provide an improved synchronizer clutch having a plurality of interconnections available.

In one aspect of the present invention, the synchronizer clutch has an input driver member driving a shift collar connectible with output driven synchronizer mechanisms.

In another aspect of the present invention, the shift collar is movable to provide interconnections between at least three output driven members.

In yet another aspect of the present invention, the shift collar is shiftable or operable to connect the input driver with each of three output driven members individually.

In still another aspect of the present invention, the shift collar is operable to interconnect two driven members either individually or simultaneously.

In a further aspect of the present invention, the input driver member is operable to connect four driven members individually with the input member.

In a yet further aspect of the present invention, the shift collar is operable to interconnect the input driver with each of four output members and also with two of the output members simultaneously.

DESCRIPTION OF THE EXEMPLARY EMBODIMENTS

Figure 1A:
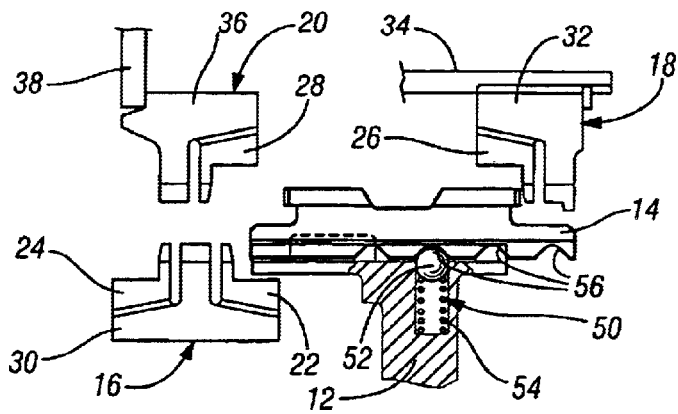
FIG. 1 is a partial elevational view of a synchronizer mechanism incorporating the present invention and shown in four operating positions.

Referring to the drawings, wherein like characters represent the same or corresponding parts throughout the several views, there is seen in FIG. 1 a synchronizer assembly 10 having an input driver member 12, a shift collar 14, a first synchronizer driven or output member 16, a second synchronizer driven or output member 18, and a third synchronizer driven output member 20.

The driven member 16 has a pair of synchronizer collars 22 and 24. The driven member 18 has a synchronizer collar 26 and the driven member 20 has a synchronizer collar 28. The input driver member 12 is continuously connected with a rotatable input member, not shown.

The driven member 16 has a hub portion 30 drivingly connected with a gear member, not shown. The driven member 18 has a hub member 32, which is drivingly connected with a shell 34, which in turn is connected with a gear member, not shown. The driven member 20 has a hub member 36, which is drivingly connected with a shell 38, which in turn is drivingly connected with a rotatable component within a transmission, not shown.

The synchronizer assembly 10 is preferably used in planetary manual type transmissions where the need for multiple connection synchronizers is well known. Each of the gear members or rotatable transmission members connected with the driven members 16, 18, and 20 might be a shaft, a sun gear member, a ring gear member, or a planet carrier member. These mechanical elements are well known in the art of transmission design such that a need to show those particular features is not believed necessary for an understanding of this invention.

Figure 1B:
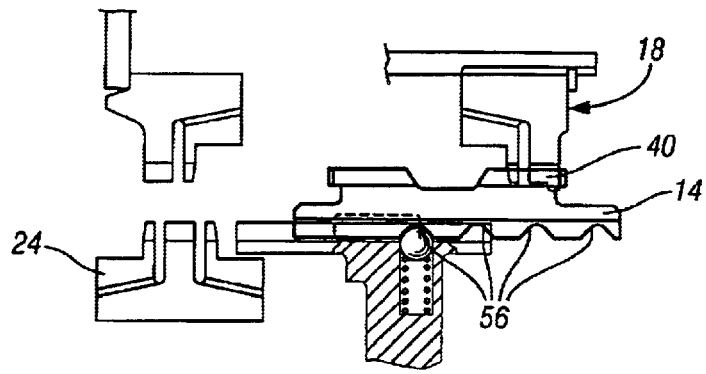
Figure 1C:
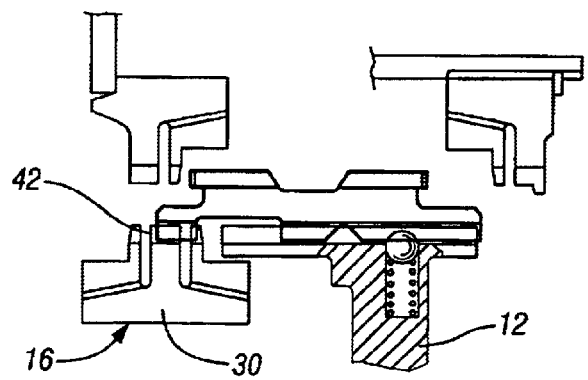
Figure 1D:
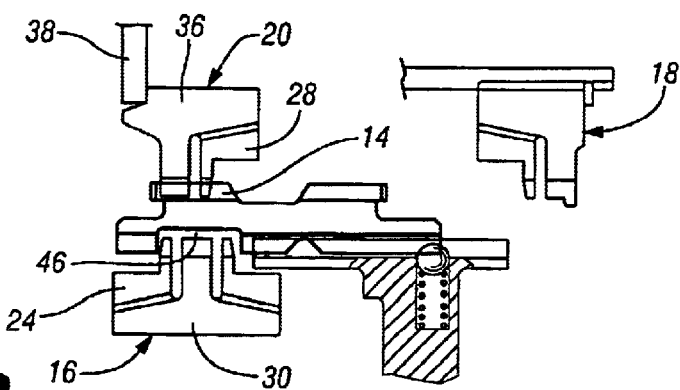

The synchronizer assembly 10 in FIG. 1A is in the neutral position. That is, the input driver 12 and shift collar 14 are not connected with any of the output driven members. In FIG. 1B, the shift collar 14 has been moved to the right such that a spline or toothed portion 40 thereof engages the driven member 18. Thus, the input driver member 12 is directly drivingly connected with the driven member 18. In FIG. 1C, the shift collar 14 is moved leftward relative to the neutral position in FIG. 1A such that a plurality of internal teeth 42 engages the hub 30 of the driven member 16. Thus, a drive connection is provided between the input driver 12 and the driven member 16. In FIG. 1D, the shift collar 14 is shown shifted to a further leftward position from neutral so that a plurality of external teeth 44 engage the driven member 20 to provide a drive connection between the input driver 12 and the hub 36.

The teeth 40 and 44 can be interconnected to provide a continuous engagement along the outer surface of the shift collar 14, however, it is preferable to leave a space in the center for a shift fork to engage with the collar 14 to permit the required shifting operations. When the shift collar 14 is moved to the right, the teeth 40 initially engage the synchronizer collar 26, which provides a cone clutch engagement with the hub 32 to provide the speed synchronization prior to completion of the engagement of the teeth 40 with the hub 32.

The synchronizer assembly 10 has a detent mechanism 50, which includes a ball 52, a spring 54, and a plurality of recesses 56. The ball 52 is loaded or urged into engagement with the recesses 56 to retain the shift collar 14 in a selected position. The shift collar 14 has a recess for each of the four positions to be selected by the shift collar.

When the synchronizer collar 14 is moved immediately leftward to engage the driven member 16, the synchronizer collar 22 is initially engaged to provide the synchronization between the input driver 12 and the hub 30. When the shift collar 14 is moved further leftward, a space 46 formed in the teeth 42 releases the hub 30 from the driving connection with the input driver 12. This releasing occurs prior to the teeth 44 engaging the synchronizer collar 28 of the driven member 20. When the shifting of the collar 14 completes the engagement between the input driver 12 and the hub 36, the hub portion 30 is free to rotate as is the synchronizer collar 24. However, on moving the shift collar 14 rightward from the position shown in FIG. 1A back to the position shown in FIG. 1C, it is necessary to provide synchronization between the shift collar 14 and the hub portion 30. This synchronization is provided by the synchronizer collar 24.

Upon reviewing the drawings and the above description, it should be now apparent to those skilled in the art that the synchronizer assembly 10 is capable of interconnecting the input member 12 individually with each of three driven members 16, 18, and 20.

A synchronizer clutch mechanism 100, shown in FIGS. 2A, 2B, 2C, and 2D, is similar to the synchronizer assembly 10, shown in FIG. 1. The synchronizer clutch mechanism 100 has an input driver member 102, which has splined therewith a hub 104. The hub 104 includes a detent mechanism 106 having a plurality of detent recesses 106A–D. The detent recesses 106A–D are formed in a shift collar 108, which is connected by a sliding spline connection with the hub 104.

Figure 2A:
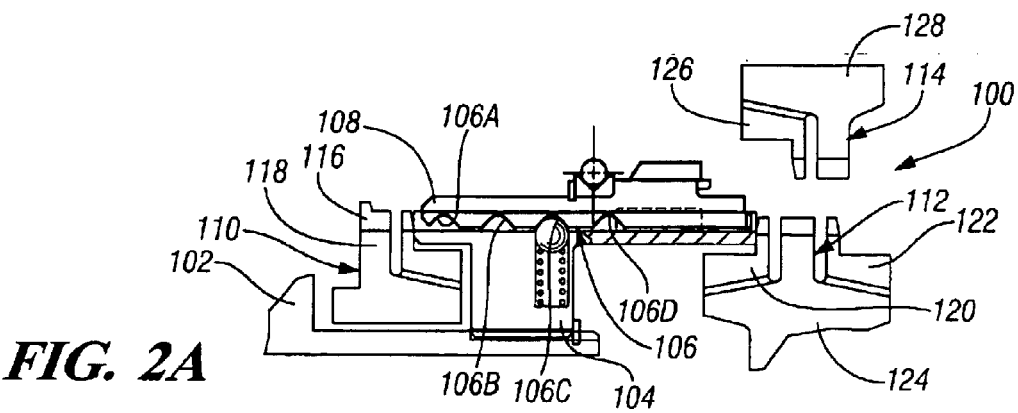
FIG. 2 is a view similar to FIG. 1 showing another embodiment of the present invention in four operating positions.

In FIG. 2A, the synchronizer clutch mechanism 100 is shown in a neutral position such that the input driver member 102 is free to rotate relative to a first output driven member 110, a second output driven member 112, and a third output driven member 114. The output driven member 110 includes a synchronizer collar 116 and a driven hub member 118. The output driven member 112 includes a pair of synchronizer hubs 120 and 122 and a driven hub 124.

The driven member 114 includes a synchronizer hub 126 and a driven hub 128. The driven hubs 118, 124 and 128 are selectively connected with gear members or other rotating components within a planetary transmission.

Figure 2B:
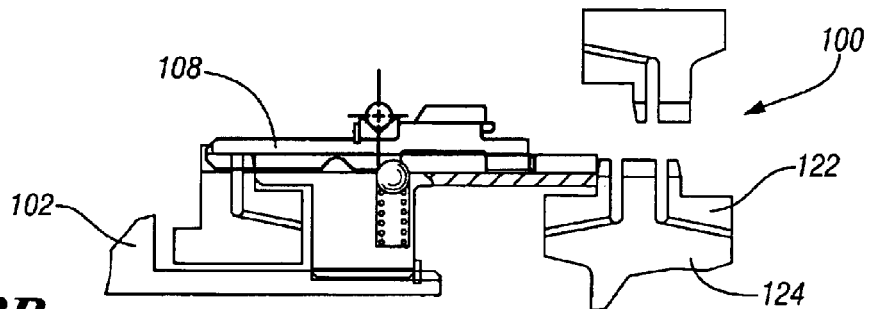

The synchronizer clutch 100 is shown in a first driving position in FIG. 2B. In this position, the shift collar 108 has been moved leftward relative to the neutral position such that an internal spline member 130 is drivingly connected with the driven member 110. This provides a rotary connection between the input driver 102 and the driven member 110 and therefore the transmission member connected therewith.

Figure 2C:
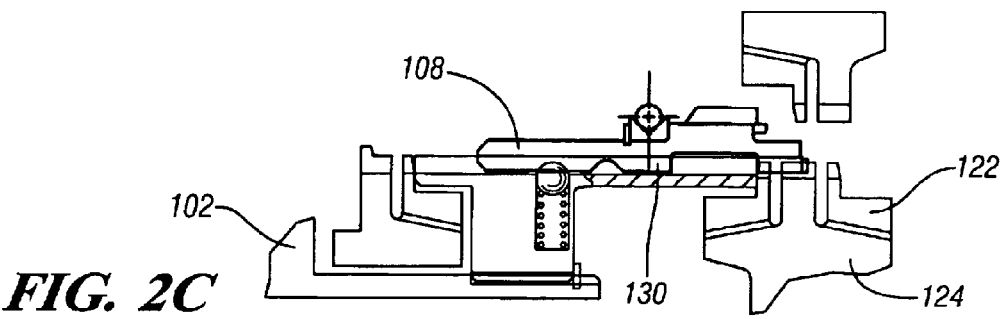

In FIG. 2C, the shift collar 108 has been moved leftward such that the spline 130 provides a drive connection between the input driver 102 and the driven hub 124. Further shifting of the shift collar 108 rightward, provides a drive connection between the shift collar 108 and the driven hub 128 through a plurality of teeth 132 formed on the outer surface of the shift collar 108. As the shift collar 108 is moved rightward to the position shown in FIG. 2D, a recess or cutout space 134 formed in the teeth 130 provides clearance for the driven hub 124 to rotate freely relative to the shift collar 108.

Figure 2D:
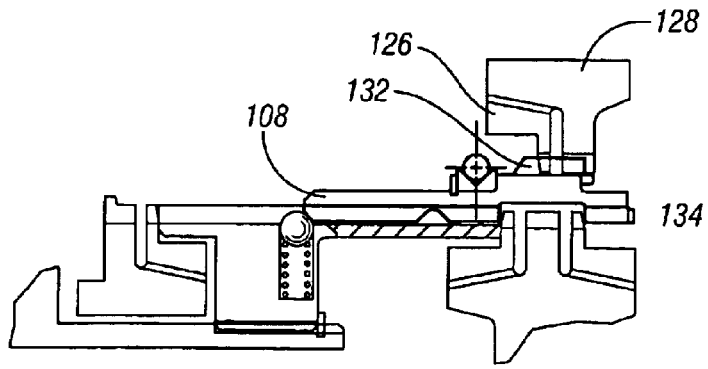

When the shift collar 108 is moved upward from the position shown in FIG. 2D, the synchronizer hub 122 establishes the synchronization necessary for the engagement of the shift collar 108 with the driven hub 124 even when the shift collar 108 is to be moved directly through that drive connection to the neutral position for left hand drive connection shown in FIG. 2B. The detent mechanism 106 provides for holding of the shift collar 108 in the selected drive positions shown in FIG. 2. The shift collar 108 has a fork connection 136, which is connected with a conventional shift fork, not shown.

The fork connection 136 and the shift fork, not shown, establish the movement of the shift collar 108 either manually by the operator or mechanically by clutch devices such as electrically driven mechanisms or hydraulically driven mechanisms. The operation of the shift collar to the various operating positions is a well-known event in the art of transmissions.

A synchronizer assembly 200, shown in FIGS. 3A, 3B, 3C, and 3D includes an input driven member 202 having splined thereto a shift collar 204. The synchronizer assembly 200 also includes a first driven member 206 and a second driven member 208.

The driven member 206 includes a pair of synchronizer hubs 210 and 212, and a driven hub 214. The driven member 208 includes a synchronizer hub 216 and a driven hub 218. It is also possible to provide another synchronizer mechanism on the left side of the input driver 202, which is not shown in this embodiment.

Figure 3A:
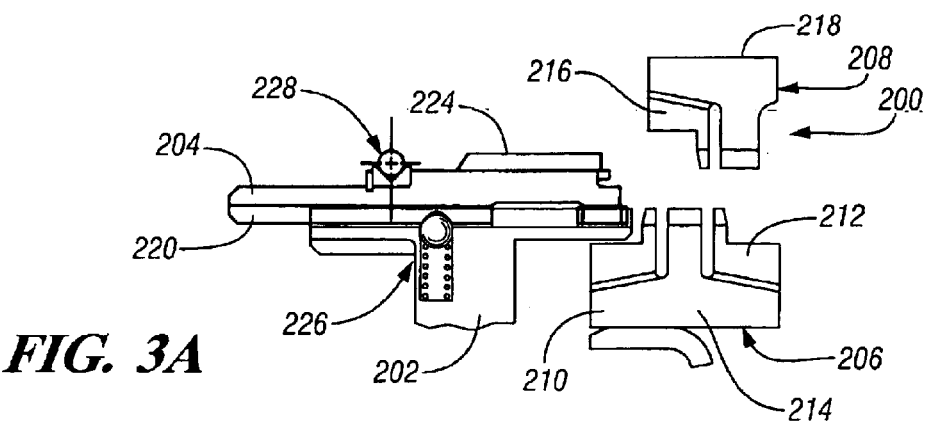
FIG. 3 is a view similar to FIG. 1 describing another embodiment of the present invention showing the synchronizer in four operating positions.
Figure 3B:
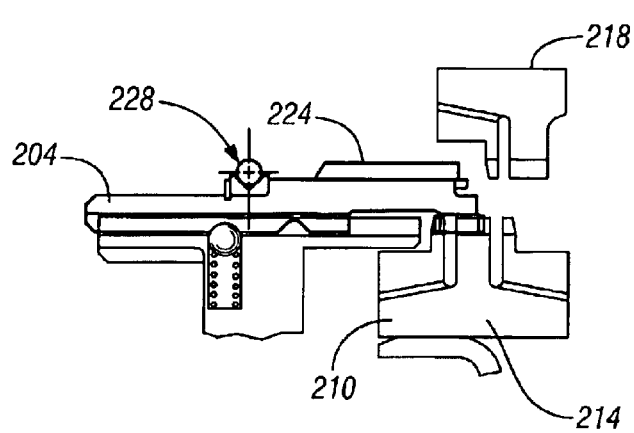
Figure 3C:
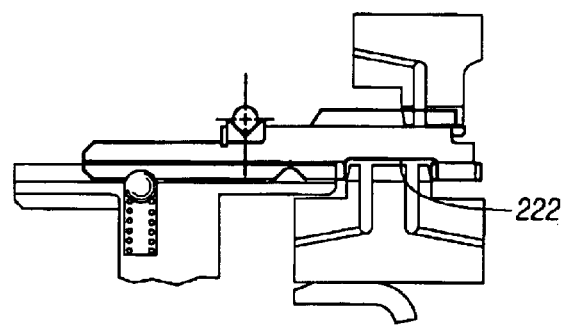
Figure 3D:
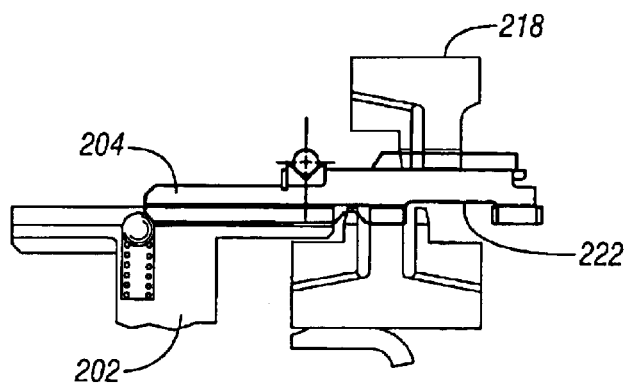

The shift collar 204 has an internal spline 220, which as best seen in FIG. 3C has a recess or cutout portion 222. The shift collar 204 also has an external spline positioned thereon at 224. A further complement of the input driver 202 is a detent mechanism 226. The detent mechanism 226, as explained above, is operable to maintain the shift collar 204 in the selected drive position.

When the shift collar 204 is moved rightward from the neutral position shown, the spline 220 first engages the synchronizer hub 210 to create speed synchronization between the input driver 202 and the driven hub 214. When synchronization is achieved, the shift collar 204 moves into engagement with the driven hub 214 to provide a positive drive connection between the input driver 202 and the driven hub 214. Further movement to the right establishes a drive connection between the shift collar 204 and the driven hub 218 and in the process engages the synchronizer hub 216 with the external spline 224. This drive position is shown in FIG. 3C.

Further movement to the right by the operator of the shift collar 204 will provide simultaneous engagement between the shift collar 204, the driven member 214, and the driven hub 218. In this position, the recess or cutout portion 222 is spanning the position radially inward of the driven member 218. In this position shown in FIG. 3D, the input driver 202 can provide a drive connection between the input drive mechanism of the transmission to at least two output mechanisms.

The position shown at 3D might be employed to establish a one-to-one ration through a planetary gearset by connecting two of the members together. The shift collar 204 has a ring or groove 228, which is connectible with a conventional shift rod or strut, not shown.

A synchronizer clutch 300 is shown in FIGS. 4A, 4B, 4C, 4D, and 4E. The synchronizer clutch 300 has an input driver member 302, which has splined thereto a shift collar 304. The synchronizer clutch 300 also has a first driven assembly 306, a second driven assembly 308, a third driven assembly 310, and a fourth driven assembly 312.

The driven assembly 306 includes a synchronizer hub 314 and a driven hub 316. The driven assembly 308 includes a synchronizer hub 318 and a driven hub 320. The driven assembly 310 includes two synchronizer hubs 322, 324, and a driven hub 326. The driven assembly 312 includes a synchronizer hub 328 and a driven hub 330. Each of the driven hub members 316, 320, 326, and 330 has splined outer surfaces. The outer surfaces of the driven hubs 316 and 326 are adapted to be engaged by an inner spline 332 formed on the shift collar 304. The splines on the driven members 320 and 330 are adapted to be engaged by splines 334 and 336, respectively, formed on the outer surface of the shift collar 304.

Figure 4A:
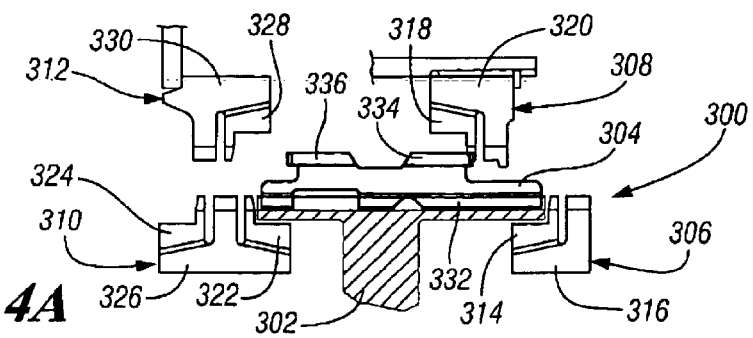
FIG. 4 is a view similar to FIG. 1 showing another embodiment of the present invention showing the synchronizer in five operating positions.

The synchronizer clutch 300 is shown in the neutral position in FIG. 4A. That is, there are no drive connections between the shift collar 304 and any of the output driven members. When the shift collar 304 is moved rightward to the position shown in FIG. 4B, the inner spline 332 engages with the driven member 306 and the driven hub 316 and the spline 334 engages with the driven hub 320 thereby providing a drive connection between the input driver 302 and both of the driven members 306 and 308. Therefore, the planetary transmission mechanisms connected with these driven members will rotate in unison with the input driver 302.

Further rightward movement of the shift collar 304 will permit disengagement of the driven hub 316 while retaining engagement with the synchronizer hub 318. Thus, a drive connection between the input driver 302 and the driven hub 320 is established. To provide synchronization between the shift collar 304 and the synchronizer hub 318 on movement leftward from the position shown in FIG. 4C, another synchronizer collar or hub would be added to the driven assembly 306.

When the shift collar 304 is moved leftward from the neutral position shown in position 4A to the position 4D, the inner spline 332 of the shift collar 304 will provide a drive connection between the input driver 302 and the output driven hub 326. The synchronizer hub 322 provides for synchronization between the shift collar 304 and the driven hub 326. Further movement of the shift collar 304 leftward to the position shown in FIG. 4E will provide a drive connection between the input driver member 302 and the driven assembly 312. In this position, the spline 336 is drivingly connected with the driven hub 330. Upon movement rightward from the position shown in FIG. 4E to the position shown in FIG. 4D, the synchronizer hub 324 will provide for synchronization between the driven hub 326 and the shift collar 304.

Figure 4B:
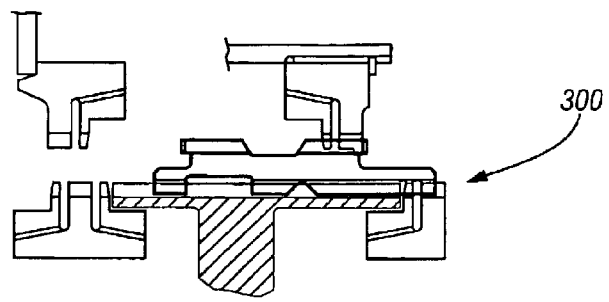
Figure 4C:
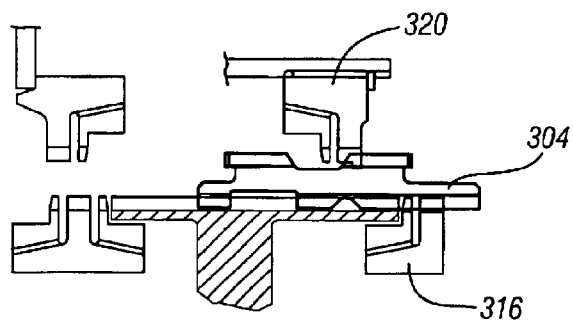
Figure 4D:
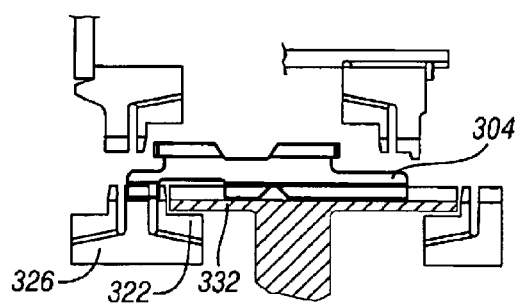

As mentioned above, a similar arrangement can be provided on the right hand side of the synchronizer clutch 300 to permit synchronization of the driven hub 316 upon movement from the position shown in FIG. 4C to the position shown in FIG. 4B.

Figure 4E:
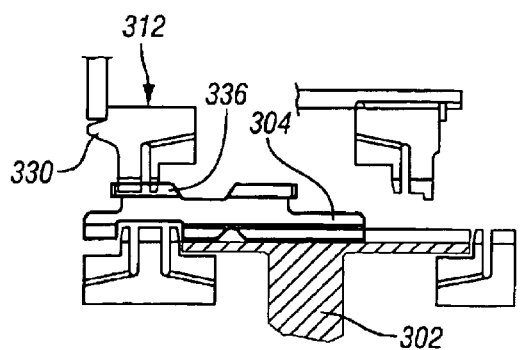

It is also possible with the present invention to provide for a position wherein the shift collar 304 engages both the driven hubs 326 and 330 by further movement of the shift collar 304 to the right from the position shown in FIG. 4E. If this operation is desired, a second synchronizer collar or hub will be added to the driven assembly 312.

Reviewing the description of the synchronizer embodiments shown and described above, it is now apparent that each of the synchronizer mechanisms is capable of at least three positions of operation. In these positions of operation, the synchronizer is capable of establishing a first single drive path, a second single drive path, and a dual drive path. Also, the synchronizers, as described above, have at least one scheme wherein the synchronizer assembly provides for three individual drive paths. Also, as described above, the synchronizer assembly can provide four drive paths wherein one of the drive paths is a dual drive path and three of the drive paths are singular. However, in this operation, the synchronizer mechanism can be provided with four individual drive paths following the teachings given herein.

What is claimed is:

1. A synchronizer clutch apparatus having an input driver with a shift collar slidably disposed thereon;

a first output driven member having a synchronizer selectively engageable with said shift collar to establish a first drive path, a second output driven member having a synchronizer selectively engageable with said shift collar to establish a second drive path, and a third output driven member having a synchronizer selectively engageable with said shift collar to establish a third drive path; and each of said drive paths being provided between said input driver and at least one of said output driven members.

2. The synchronizer clutch apparatus defined in claim 1 further comprising:

at least one of said drive paths providing a drive connection between said input driver member and two of said output driven members simultaneously.

3. The synchronizer clutch apparatus defined in claim 1 further comprising:

a fourth output driven member having a synchronizer selectively engageable with said shift collar to establish a further drive path with said input driver member.

4. The synchronizer clutch apparatus defined in claim 3 further wherein:

said shift collar is selectively engageable simultaneously with two of said driven members to provide a drive path between said input driver and said two of said output driven members.

* * * * *